Oct. 10, 1933.                G. POHL                1,929,850
                          TRACTOR WHEEL
              Filed Nov. 5, 1931          3 Sheets-Sheet 1
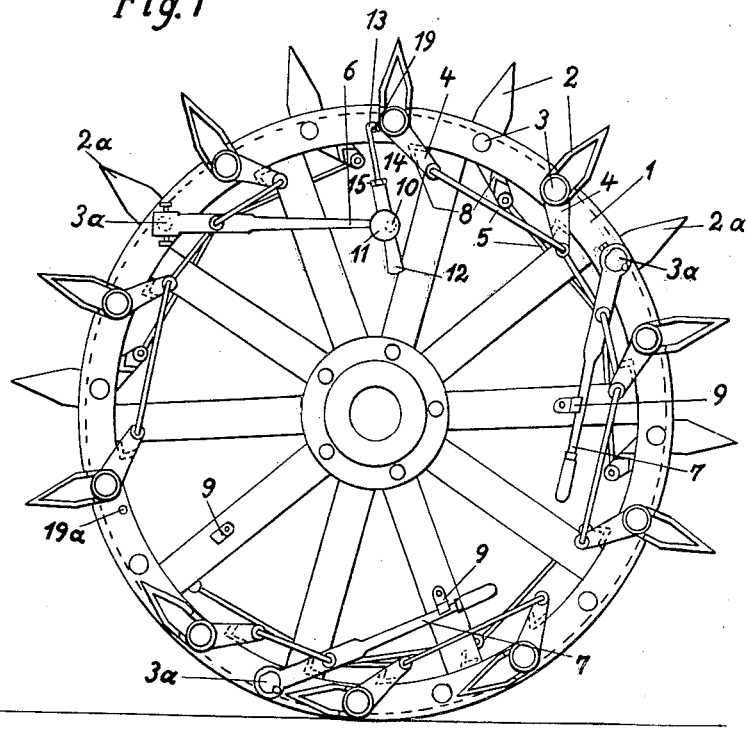
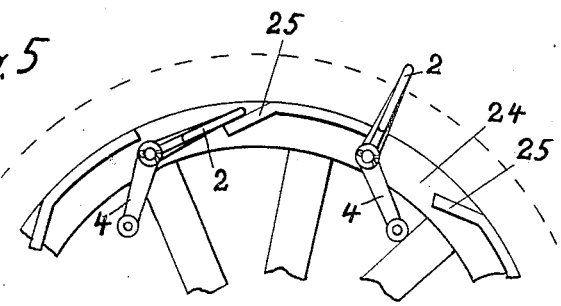
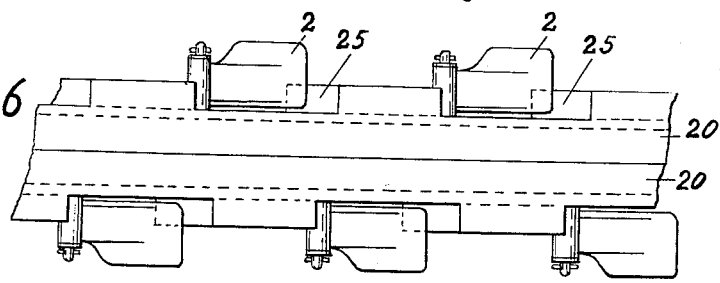
INVENTOR Oct. 10, 1933.    G. PÖHL    1,929,850
TRACTOR WHEEL
Filed Nov. 5, 1931    3 Sheets-Sheet 2
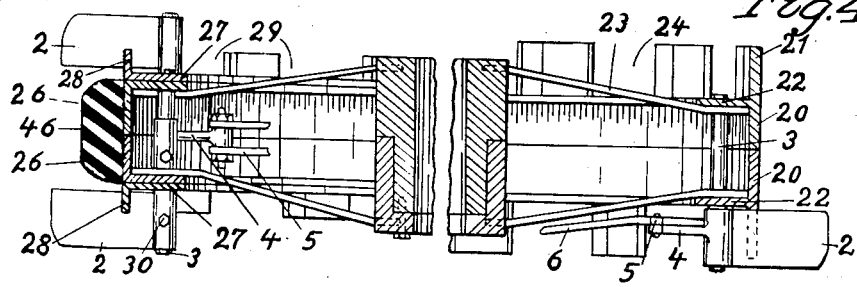
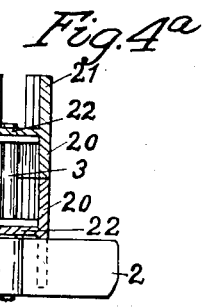
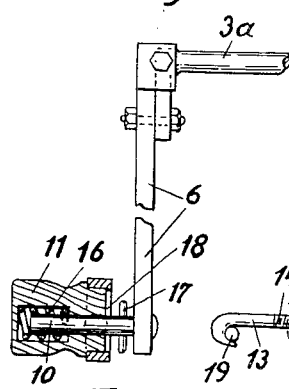
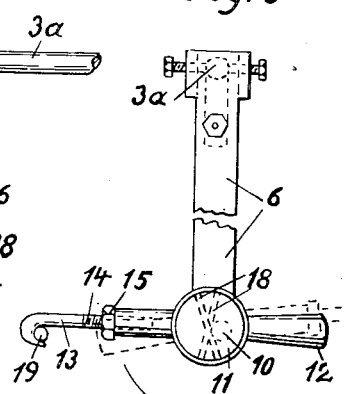
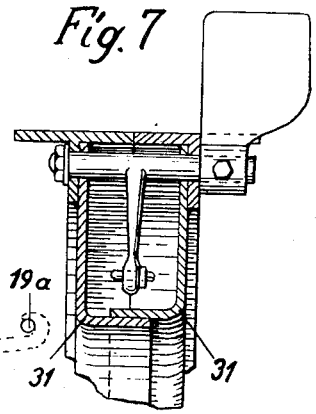
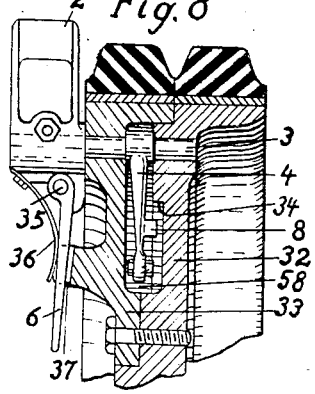
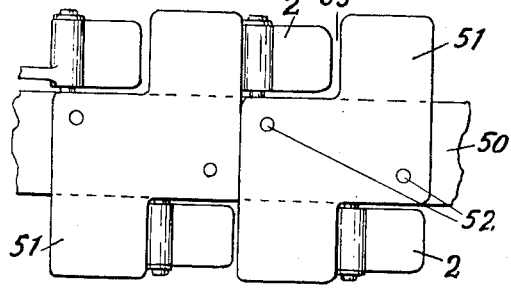
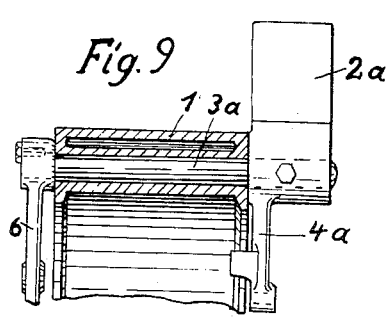
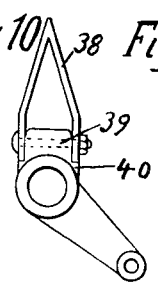
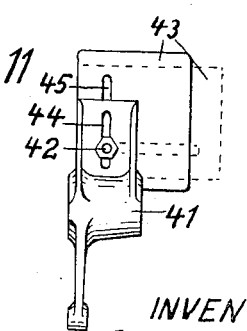
INVENTOR
Gustav Pöhl Oct. 10, 1933.  G. PÖHL  1,929,850
TRACTOR WHEEL
Filed Nov. 5, 1931  3 Sheets-Sheet 3

INVENTOR.
Gunter Pöhl

Patented Oct. 10, 1933

1,929,850

UNITED STATES PATENT OFFICE 1,929,850

TRACTOR WHEEL

Gustav Pöhl, Berlin-Wilmersdorf, Germany

Application November 5, 1931, Serial No. 573,136, and in Germany January 18, 1930

6 Claims. (Cl. 301—46)

The present invention relates to a tractor wheel having grippers which wheel will run equally well either on roads and other comparatively smooth surfaces or on soft ground, such as when working the land for agricultural purposes.

The primary object of the invention is to provide an arrangement whereby clods sticking to the grippers are removed when the gripper is moved into gripping position, clods particularly being removed from the space between the grippers and the rim so as to permit the grippers to grip the ground freely.

Another object of the invention is to provide for means by which the grippers of the wheel can be readily brought into projected or "operative" position when the wheel is to work on soft ground and to be replaced in retracted or "inoperative" position every time the wheel is to run on a smooth surface.

Another object of the invention is to provide for means by which the grippers can be adjusted in height or radially and/or parallel to the axis of the wheel in accordance with the particular requirements of the work to be done.

A further object is to enclose the means for operating the grippers so as to protect the same against the penetration of dirt.

Other objects will be further apparent and further pointed out hereafter.

The invention is more particularly described with reference to the accompanying drawings in which:—

Figure 1 is a side elevation of a gripper wheel according to the invention, with two rows of grippers arranged, one on each side of the rim and provided with stops.

Figure 2 is a side elevation on an enlarged scale of a locking arrangement for the gripper-adjusting levers.

Figure 3 is a front elevation of the same locking arrangement.

Figure 4 is a radial cross-section through one half of a gripper wheel according to the invention.

Figure 4a is also a radial cross section through one half of a gripper wheel according to this invention and shows another modification.

Figure 5 is a side elevation of a portion of another gripper wheel in which the gripper stops are formed by the edges of the lateral recesses in the rim.

Figure 6 is the development in plan view of the part of the wheel shown in Figure 5.

Figure 7 is a radial cross-section through the rim of a wheel in which the gripper levers lie in a chamber formed by the material of the wheel discs.

Figure 8 is a radial cross-section through a cast iron wheel composed of two parts with stops and gripper levers arranged in the interior of the wheel.

Figure 9 is a radial cross-section through the rim of a wheel according to the invention in which the bolt carrying the grippers is carried through the wheel and on the other side carries the adjusting lever.

Figure 10 is a side elevation of a gripper with a removable wedge-shaped steel cap.

Figure 11 is a front elevation of a gripper with a rectangular gripper plate adjustable in position in height and width.

Figure 13 is the development of a part of a wheel with widening plates screwed on.

Figure 12:
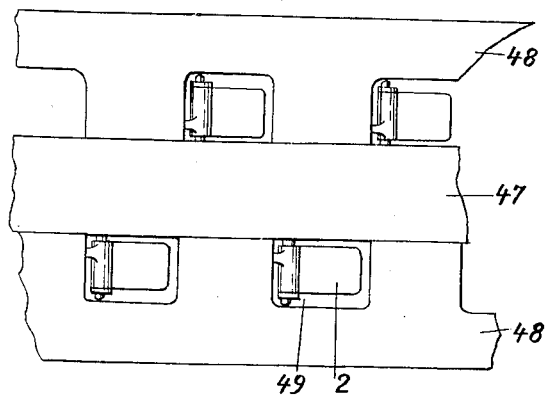
Figure 12 is the development of a part of a wheel with laterally arranged widening tyres.

The tractor wheel illustrated in Figure 1 comprises a rim formed of U-channel irons, on both sides of which the grippers 2 are movably arranged on bolts 3. The grippers 2 are provided with levers 4, the ends of which are connected by traction rods 5 to form several groups independent of each other, in each of which groups the grippers 2 can be projected into the gripping position by adjusting levers 6 and 7, or can be retracted to a position in which they do not grip the ground. In the example of construction illustrated, three groups are provided, the two upper groups being shown in the gripping position, and the lower in the collapsed position.

While the bolts 3 carrying the grippers 2 are generally fixed on the rim of the wheel and the grippers are movably arranged on the bolts, a bolt 3a in each group is journalled in the wheel rim. Each movable bolt 3a at its rear end is firmly connected to a gripper 2a and at its front end to the adjusting lever 6 (or 7) which serves for bringing the grippers 2a, as well as the other grippers 2 combined with it by their traction rods 5 to form a group, into the gripping position or to collapse them.

Figure 9 shows an enlarged vertical section taken transversely through the wheel rim of Fig. 1 and the connection of a bolt 3a journalled in the wheel rim 1 with the gripper 2a, the gripper lever 4a and the adjusting lever 6.

The arrangement of the grippers in separate groups enables the movement of the grippers from the collapsed or folded state into the gripping position to be effected without the expenditure of special force, as if necessary first the groups whose grippers do not touch the ground and are freely movable can be erected or brought up to the operative position and then the other groups after moving the tractor the distance of half the circumference of a wheel, so that on the operation of the levers 6 and 7 no work need be done in lifting the weight of the vehicle.

In order to support the grippers in their two extreme positions, the gripper levers 4 on the side towards the wheel are provided with stops 8 which in either extreme position bear on the inner edge of the wheel tyre.

To secure the grippers in either operative or inoperative position, the adjusting levers 6 and 7 can be locked by means of suitable devices to parts of the wheel. Two different arrangements are shown in Figure 1. One device consists of catches formed by springy plates 9 provided on the spokes of the wheel in which the levers 7 engage when collapsed.

The other locking device is shown in Figure 1 on the lever 6, and separately in Figures 2 and 3 on a larger scale. The adjusting lever 6 carries at its free end a fixed bolt 10, on which is a knob 11 which is formed eccentrically on its end turned to the lever 6 and is provided with a handle 12. On the eccentric knob 11 is mounted the hoop 13 which can be varied in its length by means of the screw thread 14 and lock-nut 15. Inside the knob 11 is a spring 16 which presses the knob 11 against a pawl 17 arranged on the bolt 10, which pawl in certain positions of the knob 11 engages in a recess 18 in the face of the knob 11 turned towards the lever 6. The hook 13 is turned about the eccentric knob 11 for the purpose of locking the adjusting lever 6, until in the final position the hook 13 engages a pin 19 (Figure 1) on the side of the wheel rim, whereupon by turning the knob 11 about the bolt 10 the lever 6 is tensioned.

On releasing the knob 11, the pawl 17, under the pressure of the spring 16, engages in the recess 18, whereby the lever 6 is secured against alterations in its position.

A further locking arrangement of the adjusting lever is shown in Figure 8. This figure shows in radial section transversely through the wheel a particular construction of the invention. In this construction the wheel body consisting of two cast iron parts 32, 33 carries the gripper 2 on the bolt 3, which gripper on its lever end has the adjusting lever 6 rockable about the bolt 35. The adjusting lever 6 in the end position lies in a recess 37 of the part 33 under the pressure of the leaf spring 36 and in operation is drawn outwards against the pressure of the spring 36 and rocked into the other end position of the gripper (2) where it engages on being released in another recess 37 at a suitable point.

The rim of the tractor wheel instead of being formed of U-channel irons is constructed according to the invention preferably of circularly curved L- or T-irons, so that the rim is then composed of two such iron tyres, which abut on one another by flanges and so form a connected thread.

Figures 4 and 4ª show in axial cross-section two different forms of construction, in which the wheel half shown in Fig. 4 has a rim of L-channel irons, and that shown in Fig. 4ª has a rim formed of T-channel irons.

In using T-irons, the wheel rim consists of two T-iron tyres 20, 20 placed side by side, whereby flanges 21 projecting on both sides and on the inner side two stiffening ribs 22 are formed which serve simultaneously for mounting the axial bolt 3 for the grippers 2 and to which the side discs 23 or wheel spokes are fastened (Figure 4ª). In the lateral flanges 21 cut away portions 24 are provided for the grippers 2, the edges of which serve at the same time as stops for the grippers 2, in both operative and inoperative position. An example of construction of this kind is shown in Figure 5 in side elevation, and in plan view in Figure 6. The gripper 2 shown in Figure 5 on the right is in the gripping position, the gripper on the left is shown in the collapsed condition. The plate of the gripper 2 bears in the gripping position against the edges of the cut-away portions 24 on which the plate bears when engaging in the ground against the pull of the wheel. In the collapsed condition the gripper 2 bears on the correspondingly bevelled edge 25 of the cut-away port 24. In this position the gripper 2 does not project over the wheel tread, so that travelling on surfaced roads is not prevented.

The use of T-irons for forming the rim of the wheel in the manner described has the advantage, as compared with the wheel formed of U-irons and shown in Figure 1, that the tread of the wheel can be substantially widened, and sinking of the wheel deeply into the ground is thus counter-acted.

In the construction shown in Figure 4, the wheel rim consists of two axially composite halves, and the whole wheel can be built up of two such halves. The U-shaped rim in this arrangement is composed of two L-iron tyres 26, 26 and L-iron rings 27 are mounted externally on the U-shanks, whereby lateral annular flanges 28 are formed, which are provided with recesses for the grippers 2, while the inwardly-projecting strengthening ribs of the L-irons 27 serve for the mounting or bearings of the bolts 3 for the grippers 2. In this arrangement also the levers 4 and traction rods 5 are preferably located inside the wheel, as the wheel consists of two halves, while in the wheels shown in Figures 1, 5, 6 and Figure 4ª, the traction rods are connected with the gripper levers 4 situated on both sides of the wheel and the arrangement for adjusting the grippers lies externally of the wheel. In the wheel shown in Figure 4, the gripper 2 is fastened by means of the screw bolt 30 on the bolt 3, which is movably mounted in the openings of the flanges of the L-irons 26 and 27. The gripper lever 4 is fast on the bolt 3 to which levers are connected the pull-rods 5 serving for moving the grippers. The sides of the wheel, together with the rim and hub, form a substantially closed space and protect the sensitive parts therein against shocks and dirt.

In the construction shown in Figure 7, the levers and pull-rods are mounted in the interior of a chamber in the wheel rim formed by the cover-plates 31, 31.

In Figure 8 the outer part of a wheel is illustrated in radial cross-section which is made of cast iron and composed of two separable portions 32, 33. The castings 32 and 33 are so shaped that an annular space 58 is formed in the wheel body which serves for the reception of gripper levers 4 fixed fast on the bolts 3 and the traction rods which are not illustrated. The gripper lever 4 is provided with a projection 8 forming a stop which bears in the extreme positions of the gripper on the inner edge 34 of the right-hand casting 32.

While the tractor wheels hitherto mostly employed in which the grippers are fast and immovable, the latter cannot be altered without inconvenient operations, in the wheels according to the invention the possibility is afforded of adapting the size and form of the grippers if necessary to the condition of the ground. In Figure 10 a form of a gripper is shown in front elevation, in which the point 38 of the gripper is removably fastened by means of bolts 39 to the body 40. In case the gripper is too short to find the necessary resistance in the ground, the point 38 of the gripper can be exchanged for a longer one. Also, instead of the wedge-shaped point 38 shown in Figure 10, caps of other shape can be mounted on the gripper body 40, if the condition of the ground does not permit travelling with wedge-shaped grippers.

Figure 11 shows in side elevation another form of construction of the gripper in which a rectangular gripper plate 42 is releasably fastened on the gripper body 41 by means of a bolt 42. The gripper body 41 and the gripper plate 43 are provided with slots 44, 45, so that the gripper plate 43 can be fastened in various positions on the gripper body 41. Thus where, for example, when travelling on sandy ground, a deep engagement is necessary, the gripper plate 43 is used in the drawn-out position shown, while on firmer ground the plate 43 is used preferably turned through 90° (position shown in broken lines).

As it is intended by the invention to construct the tractor wheels so that they will be suitable as far as possible for all requirements necessary in agricultural or forestry work and which are often very diverse, further auxiliary means are provided in order to increase the capacity of the wheels for use. For travelling on made roads, the treads of the wheels left free by the grippers are provided with rubber tyres which are provided with steel insertions or liners and consist of separate arcuate pieces so that they can be placed easily on the tread of the wheel and secured by suitable means to the rim. Such a rubber tyre 46 is shown in Figure 4.

For work on soft ground, on the other hand, in which the wheels would sink in deeply under the load of the vehicle, the tread surface can be widened according to the invention without employing tyres by attaching widening rings of equal diameter laterally to the tread by suitable means (not shown). An example of construction of this kind is shown in Figure 12. In order that the grippers 2 located on the face of the wheel 47 may not be limited in their freedom of movement, the stop-rings 48 are provided with suitably shaped recesses 49.

The invention provides another arrangement shown in Figure 13, for increasing the tread surface of the wheel. On the tread 50 of the gripper wheel separate plates 51 are releasably secured by means of screws 52, and are so formed that they project at both sides beyond the tread of the wheel, and have recesses 53 to provide sufficient space for the movement of the grippers 2.

For many purposes it may suffice if the tractor wheels are provided with grippers only at one side.

Figure 14:
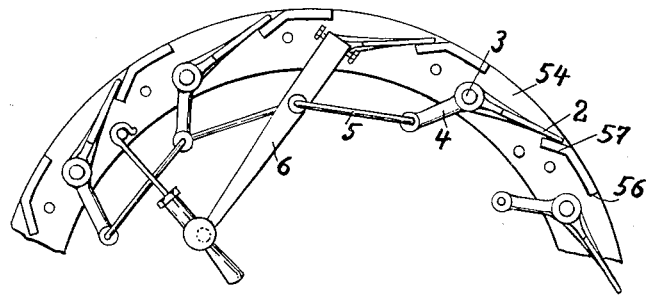
Figure 14 is a front elevation of a separate ring with the gripper arrangement screwed on laterally.
Figure 15:
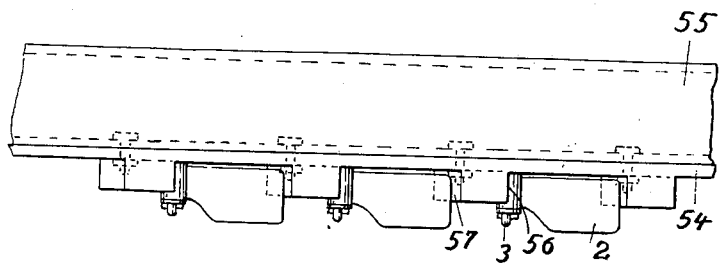
Figure 15 is the development of a part of an ordinary tractor wheel with a laterally attached ring and gripping arrangement.

In order also to enable ordinary tractor wheels to be fitted with the gripper arrangement described, the invention provides special rings on which the grippers as well as the members serving for their adjustment and locking are arranged adapted to be secured to the tractor wheels. Figure 14 is an elevation of such a construction; and Figure 15 the development of a tractor wheel 55 with attached ring 54. This ring 54 consists of arcuately curved L-irons. The grippers 2 are mounted so as to pivot or rock on the bolts 3, fixed on the ring 54 and are combined in groups by the traction rods 5 connected to the gripper levers 4, which groups are raised into the position of use by adjusting levers 6, each provided with a locking device, or are collapsed. In order to support the grippers 2 in their extreme positions the laterally directed flange of the ring 54 is partly cut away, so that the grippers 2 in the end position bear on the edges 56 or the sloping parts 57 of the recesses. The ring 54 can, however, also be provided with grippers of the kind shown in Figure 1.

In each of the several embodiments of the invention, some form of locking arrangement, of course, is desirable; preferably, one of the several forms illustrated will be used.

I claim:

1. In a tractor wheel, in combination with the rim thereof, groups of grippers pivoted to one side of the rim, a set of links connecting the grippers of each group with one another, a lever connected with each set of links and serving for actuating them to move the grippers; an eccentrically movable locking catch at the free end of each of said levers, and pins projecting laterally from the rim for engagement by said catches.

2. In combination, a tractor wheel having a hollow portion adjacent the periphery thereof, a plurality of grippers arranged adjacent said hollow portion, means pivoting said grippers to said wheel, means connecting certain of said grippers in groups for simultaneous movement of the grippers in the group from projected position upstanding from said wheel to retracted position lying inside of the peripheral boundary of the wheel, said hollow portion constituting means for substantially entirely inclosing said connecting means, means for pivotally moving the grippers in said group and means for locking the grippers in said group in either projected or retracted position as desired.

3. In a tractor wheel, a rim having a flanged tread portion peripherally thereof, said wheel having a hollow portion adjacent the periphery thereof, said flanged tread portion having a plurality of laterally opening recesses formed therein, a plurality of grippers pivotally connected to said rim adjacent said tread portion and said hollow portion for pivotal movement between operative position projecting through said recesses and inoperative position lying within said recesses, said grippers having the ground engaging portions thereof extending a substantial distance laterally beyond the edge of said flanged tread portion, and operating connections for pivotally moving said grippers from operative to inoperative position, said hollow portion constituting means for substantially entirely enclosing said connections.

4. In a tractor wheel, a rim, a plurality of grippers pivotally connected to said rim on both sides thereof with the grippers on one side in staggered relation to those on the other side, means connecting the grippers on each side into a plurality of groups, operating means for each group of grippers on one side of said rim, and means extending through said rim connecting said operating means to one of a corresponding group of grippers on the other side of said rim.

5. In a tractor wheel, a rim, a plurality of grippers pivotally connected to said rim on both sides thereof with the grippers on opposite sides in staggered relation, means connecting the grippers on each side into a plurality of groups, an operating lever for each group on one side of said wheel, pivot members extending through said rim, each rigidly connected at one end to one of said levers and at the other end to one of a group of grippers on the opposite side of said rim whereby movement of a lever to operate its connected group of grippers on one side will result in simultaneous operation of an adjacent group on the opposite side of said wheel.

6. In a tractor wheel, a rim having a peripheral flange portion on both sides thereof, each provided with laterally opening recesses therein, said recesses on one side being in staggered relation with respect to those on the other side, grippers pivotally connected to said rim portion on both sides thereof and in staggered relation, and adapted when in operative position to project one through each of said recesses and abut one edge thereof and to lie within said recesses when in inoperative position, and operating means for said grippers.

GUSTAV PÖHL.